(12) United States Patent
Hammer et al.

(10) Patent No.: US 6,761,944 B1
(45) Date of Patent: Jul. 13, 2004

(54) MOULDED ARTICLES OF CELLULOSE HYDRATE WITH ENZYMATICALLY MODIFIED SURFACE

(75) Inventors: Klaus-Dieter Hammer, Mainz (DE); Martina Koenig, Wiesbaden (DE); Theo Krams, Wiesbaden (DE)

(73) Assignee: Kalle Nalo GmbH & Co. KG, Wiesbaden (DE)

( * ) Notice: Subject to any disclaimer, the term of this patent is extended or adjusted under 35 U.S.C. 154(b) by 0 days.

(21) Appl. No.: 09/214,840

(22) PCT Filed: Jul. 4, 1997

(86) PCT No.: PCT/EP97/03530

§ 371 (c)(1),
(2), (4) Date: Jan. 13, 1999

(87) PCT Pub. No.: WO98/02046

PCT Pub. Date: Jan. 22, 1998

(30) Foreign Application Priority Data

Jul. 15, 1996 (DE) .......................... 196 28 232

(51) Int. Cl.⁷ .......................... A22C 13/00; A22C 13/02
(52) U.S. Cl. .................. 428/34.8; 428/36.9; 428/36.91; 426/105; 426/135; 426/138; 426/140; 138/118.1; 162/9; 162/72; 435/277
(58) Field of Search .............................. 428/34.8, 36.9, 428/36.91; 426/105, 135, 138, 140; 138/118.1, 11.1; 162/9, 72; 435/277, 278

(56) References Cited

U.S. PATENT DOCUMENTS

| | | | | |
|---|---|---|---|---|
| 4,009,313 A | * | 2/1977 | Crawford et al. | 428/290 |
| 4,388,331 A | * | 6/1983 | Miller | 426/63 |
| 4,546,023 A | * | 10/1985 | Kastl et al. | 138/118.1 |
| 5,175,275 A | | 12/1992 | Dobashi et al. | 536/56 |
| 5,262,211 A | * | 11/1993 | Hammer et al. | 428/34.8 |
| 5,277,857 A | * | 1/1994 | Nicholson et al. | 264/187 |
| 5,736,179 A | * | 4/1998 | Hammer et al. | 426/105 |
| 6,051,414 A | * | 4/2000 | Videbaek et al. | 435/209 |
| 6,156,562 A | * | 12/2000 | Cox | 435/263 |

FOREIGN PATENT DOCUMENTS

| | | |
|---|---|---|
| DE | 44 39 149 | 9/1996 |
| EP | 634101 | 1/1995 |
| EP | 718 406 | 6/1996 |
| FR | 1546629 | 10/1968 |
| GB | 1110503 | 4/1968 |
| WO | 89/10381 | 11/1989 |
| WO | WO 97/31970 | 9/1997 |

* cited by examiner

*Primary Examiner*—Harold Pyon
*Assistant Examiner*—Sow-Fun Hon
(74) *Attorney, Agent, or Firm*—Foley & Lardner LLP

(57) ABSTRACT

The invention relates to a process for the treatment, in particular for the roughening, of the surface of hydrated cellulose shaped articles, in which at least one cellulase is allowed to act on the surface and is then inactivated permanently. The tubular films modified in this way are particularly suitable as foodstuff casings, specifically as sausage casings.

21 Claims, No Drawings

MOULDED ARTICLES OF CELLULOSE HYDRATE WITH ENZYMATICALLY MODIFIED SURFACE

This application is a 371 of PCT/EP97/03530 filed Jul. 4, 1997, and claims priority from German application No. 19628232.2, filed Jul. 14, 1996.

BACKGROUND OF INVENTION

The invention relates to shaped articles based hydrated cellulose and to a process for the treatment of the surface of such shaped articles. The tubular shaped articles are particularly suitable as foodstuff casings, specifically as sausage skins.

The production of hydrated cellulose shaped articles by the viscose process has been known for a long time. In this process, an aqueous solution of cellulose xantho-genate is extruded into an acid precipitating bath. It is regenerated there to hydrated cellulose. The hydrated cellulose is initially present here in the gel state. A seamless, tubular shaped article is obtained if the viscose solution is extruded through an annular die. Hydrated cellulose shaped articles can also be produced by other processes, for example by the copper oxide/ammonia process (superseded industrially) or the amine oxide process using N-methylmorpholine N-oxide (DE-A 196 07 953).

The tubular sausage casings based on hydrated cellulose which are produced in this way are often treated with various preparations on the inside and/or outside, according to the envisaged end use. For example, blood sausage adheres very firmly to the hydrated cellulose casing. So that the casing can nevertheless be peeled off easily, without thereby tearing open the frying surface, it is provided with a release preparation on the inside. A suitable release preparation comprises, for example, a chromium-fatty acid complex compound and a dialkyl-polysiloxane. Sausage meat for long-lasting sausages, on the other hand, has the tendency to become detached from the cellulose casing in the course of time. The adherence between the meat stuffing and casing is therefore increased with an appropriate internal preparation. The adherence preparation also comprises a water-insoluble cured cationic resin and an oil. The oil here may be a vegetable oil, a triglyceride mixture of plant fatty acids, a paraffin oil or a silicone oil. Other preparations comprise a resin and particles or fibers of plastic or cellulose. They provide a rough surface.

Internal and external preparations are generally applied to the cellulose gel tube. However, the application here is not always uniform. It depends on the degree of swelling and on the water content of the hydrated cellulose gel tube, and also on the nature of the device employed for the application. The squeeze rolls arranged before the dryer can furthermore cause folds. In general, the application becomes less uniform the smoother the surface. In the case of the fiber-reinforced casings, the surface becomes smoother if more viscose solution has been applied. The surface of such smooth sausage casings must be roughened with an appropriate external preparation, so that, after watering, this casing can be pushed onto the filling pipe even with greasy hands. A non-uniform, streaky application of the external preparation would make handling more difficult.

SUMMARY OF INVENTION

The object was therefore to provide a process with which the surface of hydrated cellulose shaped articles can be roughened to a more or less pronounced extent as desired, so that an external preparation to increase the roughness is no longer necessary. Furthermore, the customary internal and external preparations should be distributed more uniformly over the surface and adhere better.

The object is achieved by treating the flat or tubular hydrated cellulose shaped article, preferably in the gel state, with a cellulase over a defined period of time. "Flat shaped article" is to be understood in general terms as meaning a flat film.

The present invention thus relates to a process for the treatment of flat or tubular hydrated cellulose shaped articles, in particular foodstuff casings, which comprises allowing at least one cellulase to act on the surface and then inactivating this cellulase permanently.

The present invention also relates to flat or tubular shaped articles, in particular foodstuff casings, based on hydrated cellulose, the surface of which is modified by the time-limited action of at least one cellulase. They can be produced by any desired process, but preferably by the viscose or amine oxide process.

DETAILED DESCRIPTION OF INVENTION

There are cellulases which exhibit their highest activity in a slightly acid environment (pH 4.5 to 5.5) and those which are particularly active in a virtually neutral environment (pH 6 to 7). Both types of cellulases can be used in the present process. They are usually prepared from Aspergillus or Trichoderma species. The cellulase should accordingly act on the shaped article at a pH in the range from 4.0 to 7.5, preferably from 4.5 to 7.0. The cellulases are inactivated permanently by increasing the pH to more than 8. The same effect is achieved if the temperature rises to more than 70° C. A temperature of more than 70° C. is usually reached during the drying step customary in the viscose or amine oxide process. Additional heating of the cellulose shaped article is therefore not necessary as a rule.

In general, the cellulase is allowed to act on the hydrated cellulose shaped articles for 20 seconds to 40 minutes, preferably 2 minutes to 20 minutes. The surface roughness increases with the duration of the action. The temperature here is 50 to 68° C., preferably up to 60° C. The enzyme develops its highest activity at this temperature. Below 50° C., the degradation process effected by the cellulase is slowed down and the action time must then be correspondingly longer. It has proved favorable to employ aqueous solutions with a content of 0.2 to 20% by weight, preferably 0.5 to 5% by weight, of cellulase, based on the total weight of the solution.

Tubular hydrated cellulose shaped articles can be treated with the enzyme solution on the inside and/or outside. By appropriate adjustment of the cellulase concentration in the internal and external bath, it is also possible to achieve a roughness on the inside which differs from that on the outside. The shaped articles treated with enzyme are recognizable by a more or less smooth surface. The process according to the invention can be used for pure, that is to say not fiber-reinforced, hydrated cellulose casings, but also equally well for fiber-reinforced hydrated cellulose casings. The fiber-reinforced casings are produced by applying the viscose solution to the fiber reinforcement from the outside, from the inside or from both sides. The casings produced in this way are accordingly called externally viscosed, internally viscosed or double-viscosed casings. The fiber reinforcement usually comprises a hemp fiber nonwoven. The cellulase-treated casings which are not fiber-reinforced usually have an opaque appearance.

The viscose solution may also comprise various additives, such as alginate. The content of these additives may be up to 30% by weight, based on the total weight of the viscose solution. The properties of the shaped articles, in particular the mechanical properties, can therefore be modified further.

Enzymes having a cellulytic action are generally feared in the meat products sector and everything has been done to avoid their occurrence. In the maturation of long-life sausages, they can be formed by certain molds and yeasts under adverse climatic conditions and can cause hydrated cellulose casings to be severely damaged or even destroyed. Damaged casings can be removed from the meat stuffing only with great difficulty and also only in shreds.

On the basis of the abovementioned action, such enzymes were excluded from the production of foodstuff casings, in particular sausage casings. In the search for alternatives for rough surface preparation of fiber casings and matting of pure hydrated cellulose casings, the decision to employ the destructive properties of enzymes in a targeted and controlled manner to achieve specific surface effects took shape.

The enzyme treatment can be integrated into various phases of the viscose or amine oxide process. They can act on the cellulose shaped articles while these are still in the gel state. The casings produced by the viscose process have a swelling value of about 200 to 220%, while those produced by the amine oxide process have a swelling value of up to 320%. The enzymes can then also reach deeper zones. Within a shorter period of time and/or at a lower enzyme concentration (up to 3% by weight of cellulase, based on the total weight of the enzyme-containing solution), significant roughening effects can already be achieved. The cellulase treatment can be integrated best, and above all without high industrial outlay, in this phase. The enzyme treatment can also be combined with a secondary plasticizing. The secondary plasticizer is primarily glycerol.

However, it is also possible to pass the already dried hydrated cellulose shaped articles through the enzyme bath or to spray them with the enzyme solution. After the drying, the swelling value has fallen to about 130 to 140% in the case of the casings produced by the viscose process, and to about 180% in the case of those produced by the amine oxide process. The hydrated cellulose has assumed a denser structure. Subsequent cellulytic degradation therefore takes place predominantly on the surface, and to a lesser extent depthwise.

The enzyme which has been inactivated by heat and/or alkali can be used at the same time as an adhesive impregnation. Like other proteins, it can be bonded to the cellulose by customary curing or crosslinking agents.

The tubular foodstuff casings produced by the process according to the invention exhibit the further advantage that the internal or external preparations described above can be applied considerably better and more uniformly. More of these adhere, so that significantly better effects can be achieved with smaller application amounts. Because of the roughened surface structure, the casings are easier to print on. This is particularly important for sausage casings which are printed by the flexographic printing process. Long sections of the casings according to the invention can also easily be pushed onto the filling pipe in the watered state without an additional coating being necessary to increase the roughness. Finally, gathering (=accumulation) of the tubular casing in sections is also facilitated.

The following examples are intended to illustrate the invention without limiting it in any way.

EXAMPLE 1

An externally viscosed hydrated cellulose tube of caliber 48 (=48 mm diameter) was passed in the gel state through a plasticizer vat which contained, per liter, 100 g of glycerol, 25 g of cellulase (®Cellusoft L from Novo Nordisk A/S, Bagsvaerd, Denmark) and water as the remainder and had a pH of 6 to 7 and a temperature of 50 to 60° C. The residence time in this vat was 10 min. Thereafter, the water adhering to the surface was stripped off. The tubular casing was then provided with a customary adhesive impregnation on the inside. The tube was then inflated to the caliber with air ("supporting air") and dried with hot air down to a residual moisture content of 8 to 10% by weight, based on the total weight. The outer surface was rough and matt. No difference from the casings which had not been treated with enzyme was found in the mechanical properties, in particular the strength. Because of the rough surface, the watered casing sections could be separated from one another easily and pulled up onto the filling pipe. The filling operation itself, the maturing process and the ease of peeling corresponded to a casing which had not been treated with enzyme.

EXAMPLE 2

A double-viscosed, fiber-reinforced hydrated cellulose gel tube of caliber 60, in which 40% of the viscose solution was applied to the fiber nonwoven from the outside and 60% of the viscose solution was applied from the inside, was treated on the inside and outside with a solution which contained, per liter, 100 g of glycerol, 30 g of ®Cellusoft L and water as the remainder. The pH of the solution was 6 to 7 and its temperature was 50 to 60° C. The duration of treatment was 20 minutes. The tube was freed from the adhering residues of solution by squeezing off with the aid of a pair of rolls and was then deposited in a container. Before intake into the dryer, the tube was finally also impregnated with a 2% strength by weight aqueous glyoxal solution. The enzyme-protein was firmly bonded to the cellulose surface in this manner and thus resulted in an adhesive impregnation. The tube was then dried in the inflated state at above 70° C. until the residual moisture content was 8 to 10% by weight. It was rough and opaque.

Long watered sections could be pushed effortlessly onto the filling pipe. The casing was then filled with sausage meat for long-lasting sausages. Even after a long period of maturation, the casing still adhered adequately and uniformly to the meat stuffing. At the end of the maturation process, the casings could be peeled off without any difficulty. The ease of peeling was evaluated as "2.5" (subjective scale from 1 to 6; 1=can be peeled off very easily, 6=can be peeled off only by destroying the casing or tearing open the frying surface).

EXAMPLE 3

A hydrated cellulose gel tube of caliber 40 was passed through a plasticizer vat which contained, per liter, 100 g of glycerol, 15 g of ®Cellusoft L and water as the remainder. The pH was again 6 to 7, but the temperature was 60 to 65° C. The duration of action was shortened to 5 minutes. Excess treatment solution was squeezed off as described. The casing was then inflated to the caliber with air and dried with hot air to a residual moisture content of 8 to 10% by weight. The casing was then gathered into worms in sections, the moisture content being increased to 14 to 16% by weight. The outer surface was rough and matt. Owing to the enzyme treatment, the behavior of the casing during filling had improved significantly. The filling caliber varies to a lesser degree than in casings which had not been treated with enzyme. The other mechanical properties were in the usual range.

EXAMPLE 4

A hydrated cellulose gel tube of caliber 38 which had been colored brown was passed through a plasticizer vat which contained, per liter, 100 g of glycerol, 20 g of ®Cellusoft L and water as the remainder. The pH and temperature of the treatment solution were as stated in Example 3. The residence time of the tube in the vat was 2 minutes. Excess solution was squeezed off again. During subsequent drying with hot air, the tube was passed helically over a roll and in this way converted into a wreath shape. The surface of the finished casing was rough and matt. The mechanical properties of the tube were not impaired.

What is claimed is:

1. A process for the treatment of tubular foodstuff casings based on cellulose hydrate, which comprises allowing at least one cellulase to act on the surface of the tubular foodstuff casings based on cellulose hydrate, and then inactivating the at least one cellulase permanently before filling the tubular foodstuff casings.

2. The process as claimed in claim 1, wherein the cellulase is allowed to act at a pH in the range from 4.0 to 7.5.

3. The process as claimed in claim 1, wherein the cellulase is inactivated by increasing the pH to more than 8 and/or increasing the temperature to more than 70° C.

4. A process for the treatment of tubular foodstuff casings based on cellulose hydrate, which comprises allowing at least one cellulase to act on the surface of the tubular foodstuff casings based on cellulose hydrate and then inactivating the at least one cellulase permanently, wherein the cellulase is allowed to act for 20 seconds to 40 minutes.

5. The process as claimed in claim 1, wherein the cellulase is employed in the form of an aqueous solution with a content of 0.2 to 20% by weight, of cellulase, based on the total weight of the solution.

6. A tubular foodstuff casing based on cellulose hydrate, the surface of which is modified by the time-limited action of at least one cellulase to produce a modified surface comprising permanently inactivated cellulase before filling the tubular foodstuff casing.

7. The tubular shaped article as claimed in claim 6, which is modified by the action of the cellulase on the inside and/or outside.

8. The tubular shaped article as claimed in claim 7, produced according to a process which comprises:
   subjecting the article of claim 7 to the action of a fungicidal solution and/or a release or adhesive preparation.

9. The tubular shaped article as claimed in claim 7, which is reinforced with a fiber nonwoven.

10. A foodstuff casing comprising the tubular shaped article as claimed in claim 7.

11. The process as claimed in claim 1, wherein the cellulase is allowed to act at a pH in the range from 4.5 to 7.0.

12. The process as claim in claim 1, wherein the cellulase is allowed to act at a temperature in the range of up to 60° C., for 2 minutes to 20 minutes.

13. The process as claimed in claim 1, wherein the cellulase is employed in the form of an aqueous solution with a content of 0.5 to 5% by weight of cellulase, based on the total weight of the solution.

14. A process as claimed in claim 1, wherein the tubular foodstuff casings based on cellulose hydrate are produced by the viscose or amine oxide process and wherein the cellulase acts on the shaped articles while the cellulose is still in the gel state.

15. A process as claimed in claim 1, wherein the tubular foodstuff casings based on cellulose hydrate are produced by the viscose or amine oxide process and wherein the cellulase acts on the shaped articles after the cellulose has been regenerated and dried.

16. A process according to claim 1, further comprising:
   producing said tubular foodstuff casings by a viscose or amine oxide process;
   wherein the step of allowing the at least one cellulase to act on the shaped article occurs while the cellulose is in a gel state.

17. A process according to claim 1, further comprising:
   producing said tubular foodstuff casings by a viscose or amine oxide process:
   regenerating the cellulose; and
   drying the cellulose;
   wherein the step of allowing the at least one cellulase to act on the shaped article occurs after the steps of regenerating and drying.

18. The tubular shaped article as claimed in claim 7, wherein said article comprises hemp fibers.

19. A tubular shaped article according to claim 6, wherein the casing exhibits uniform adherence to the fillings.

20. A tubular foodstuff casing according to claim 6, wherein the casing can be peeled away from a filling without destroying the casing.

21. A process for the treatment of tubular foodstuff casings according to claim 4, wherein the cellulase is allowed to act at a temperature in the range of 50 to 68° C.

* * * * *